United States Patent
Hong et al.

[11] Patent Number: 5,982,009
[45] Date of Patent: Nov. 9, 1999

[54] INTEGRATED DEVICE OF CANTILEVER AND LIGHT SOURCE

[75] Inventors: Songcheol Hong, Taejon-shi; Sookun Jeon, Kunsan-shi, both of Rep. of Korea

[73] Assignee: Korea Advanced Institute of Science & Technology, Taejon-shi, Rep. of Korea

[21] Appl. No.: 09/001,386

[22] Filed: Dec. 31, 1997

[30] Foreign Application Priority Data

Mar. 1, 1997 [KR] Rep. of Korea ............................ 00024

[51] Int. Cl.$^6$ ...................................................... G01B 5/28
[52] U.S. Cl. .................... 257/414; 250/227.19; 250/306; 250/307; 250/491.1; 250/442.1; 250/442.11
[58] Field of Search ............................... 250/227.19, 306, 250/307, 491.1, 442.1, 442.11; 257/414

[56] References Cited

U.S. PATENT DOCUMENTS

| | | | |
|---|---|---|---|
| 5,260,567 | 11/1993 | Kuroda et al. | ...................... 250/227.19 |
| 5,493,177 | 2/1996 | Muller et al. . | |
| 5,596,194 | 1/1997 | Kubena et al. . | |
| 5,883,387 | 3/1999 | Matsuyama et al. | .................... 250/306 |

*Primary Examiner*—Fetsum Abraham
*Attorney, Agent, or Firm*—Dilworth & Barrese

[57] ABSTRACT

An integrated device having a configuration, in which a cantilever and a light source are integrated on a single substrate, and applicable to a variety of fields, for example, ultra-fine quantity sensors, and a method for fabricating such a device. The light source such as LED, LD or SEL and the cantilever are integrated together on a single substrate in such a manner that they are arranged in proximity because the distance between the light source to the cantilever has no influence on the amplification rate. Accordingly, the device of the present invention requires no additional alignment for its constituting elements. In accordance with this configuration, it is possible to greatly reduce the space occupied by the constituting elements. It is also possible to reduce the limitation on the focusing of light. Since the integrated device of the present invention can accurately measure a micro displacement of the cantilever, it can be applied to micro physical quantity sensors. The device can also be used to measure displacement of a SPM tip. In addition, the device of the present invention may be used to achieve an alignment required in optical devices and LD's.

15 Claims, 9 Drawing Sheets

5,982,009

INTEGRATED DEVICE OF CANTILEVER AND LIGHT SOURCE

BACKGROUND OF THE INVENTION

1. Field of the Invention

The present invention relates to an integrated device having a configuration, in which a cantilever and a light source (LED, LD or SEL) are integrated on a single substrate, and applicable to a variety of fields, for example, ultra-fine quantity sensors, and a method for fabricating such a device.

2. Description of the Prior Art

FIG. 1 illustrates a conventional atomic force microscope (AFM) using a light source and a cantilever.

AFM's are adapted to analyze the surface of a sample using a force effecting between atoms in order to observe the sample surface in an atomic magnification. Such AFM's have an advantage in that a variety of samples such as conductors, semiconductors, magnetic substance and dielectric substance can be easily observed in the atmosphere, irrespective of the conductivity of the sample because those AFM's utilize a force effecting between an atom in a local portion of the sample and an atom on the tip of a cantilever. Since the cantilever is constituted by a soft spring, it is bent during its sample scanning operation by a force effecting between the atom on the tip of the cantilever and atoms of the sample. The force causing the cantilever to be bent is measured using an appropriate method. The measured value is then converted into an electrical signal which is, in turn, processed in a reverse feedback manner. Using the resultant signal, it is possible to obtain three-dimensional information about the surface of the sample.

In the case of the AFM shown in FIG. 1, a light beam emitted from a light source 11 is reflected from a cantilever 13 and then incident on a position photodetector 12, so that the position photodetector 12 senses the incident light beam. As shown in FIG. 1, a tip 14 is provided on the lower surface of the cantilever 13 at the free end of the cantilever 13. When the tip 14 approximates to the surface of a sample to be observed, the cantilever 13 is bent due to an attractive force effecting between the sample surface and the tip 14. As a result, a displacement occurs in the cantilever 13. This displacement results in a shift of the light beam which is reflected from the cantilever 13 and then incident on the position photodetector 12. The position photodetector 12 senses such a shift of the incident beam corresponding to a displacement of the cantilever 13. In such a manner, the position photodetector 12 detects even a micro displacement of the cantilever 13.

However, in the case of the conventional AFM, it is difficult to focus the light beam and to align the light source 11 and cantilever 13 with each other because the light source 11 and cantilever 13 are spaced apart from each other. There is also a problem in that a certain space is required because the light source 11 and cantilever 13 should be spaced apart from each other.

Meanwhile, assuming that "L1" and "L2" represent the distance from the light source 11 to the cantilever 13 and the distance from the cantilever 13 to the position photodetector 12, respectively, the amplification rate used in the conversion of a micro displacement of the cantilever 13 into a shift of the light beam is proportional to "L2" while being irrespective of "L1".

In other words, an increase in the distance L2 from the cantilever 13 to the position photodetector 12 results in an increase in the amplification rate. In this case, the micro displacement of the cantilever 13 is correspondingly amplified. Accordingly, the shift of the light beam caused by the displacement of the cantilever 13 is also amplified, so that it is accurately detected by the position photodetector 12. However, the distance L1 between the light source 11 to the cantilever 13 has no influence on the amplification rate.

Therefore, where the light source 11 and cantilever 13 are integrated together on a single substrate while reducing the distance L1 therebetween, it is unnecessary to make a separate effort to align the light source 11 and cantilever 13. In this case, the space occupied by the light source 11 and cantilever 13 is also reduced. Since the light source 11 and cantilever 13 are approximate to each other, the limitation in focusing the light beam is reduced.

SUMMARY OF THE INVENTION

The present invention has been made in view of the fact that the distance from the light source to the cantilever has no influence on the amplification rate for a shift of a light beam and, therefore, an object of the invention is to provide a device having a configuration including a light source and a cantilever integrated together in various forms on a single substrate, and a method for fabricating the device.

In accordance with one aspect, the present invention provides an integrated device comprising a cantilever and a light source integrated together on a single substrate.

In accordance with another aspect, the present invention provides a method for fabricating an integrated device including a cantilever and a light source integrated together on a single substrate, comprising the steps of: (A) preparing a silicon substrate having a crystal orientation of (100), sequentially growing an $SiO_2$ layer and an $Si_3N_4$ layer over the silicon substrate in such a manner that the grown layers have a crystal orientation of (111), forming an etch pit in the $SiO_2$ and $Si_3N_4$ layers and the silicon substrate, depositing a material to be used as the cantilever in the etch pit, forming a photoresist film pattern, removing selected portions of the $SiO_2$ and $Si_3N_4$ layers using the photoresist film pattern as a mask, and completely removing the photoresist film pattern while selectively removing the silicon substrate; (B) etching the silicon substrate at a back side thereof, thereby forming a light emitting element holder; and (C) separately fabricating a light emitting element, and attaching the light emitting element to the light emitting element holder in accordance with a flip chip method.

BRIEF DESCRIPTION OF THE DRAWINGS

Other objects and aspects of the invention will become apparent from the following description of embodiments with reference to the accompanying drawings in which:

FIG. 2b is a sectional view of the integrated device shown in FIG. 2a;

FIG. 2c is a cross-sectional view taken along the facet C of FIG. 2a;

FIG. 3b is a sectional view illustrating the integrated device shown in FIG. 3a;

DETAILED DESCRIPTION OF THE PREFERRED EMBODIMENTS

Now, the present invention will be described in conjunction with various embodiments thereof.

First Embodiment

Figure 1:
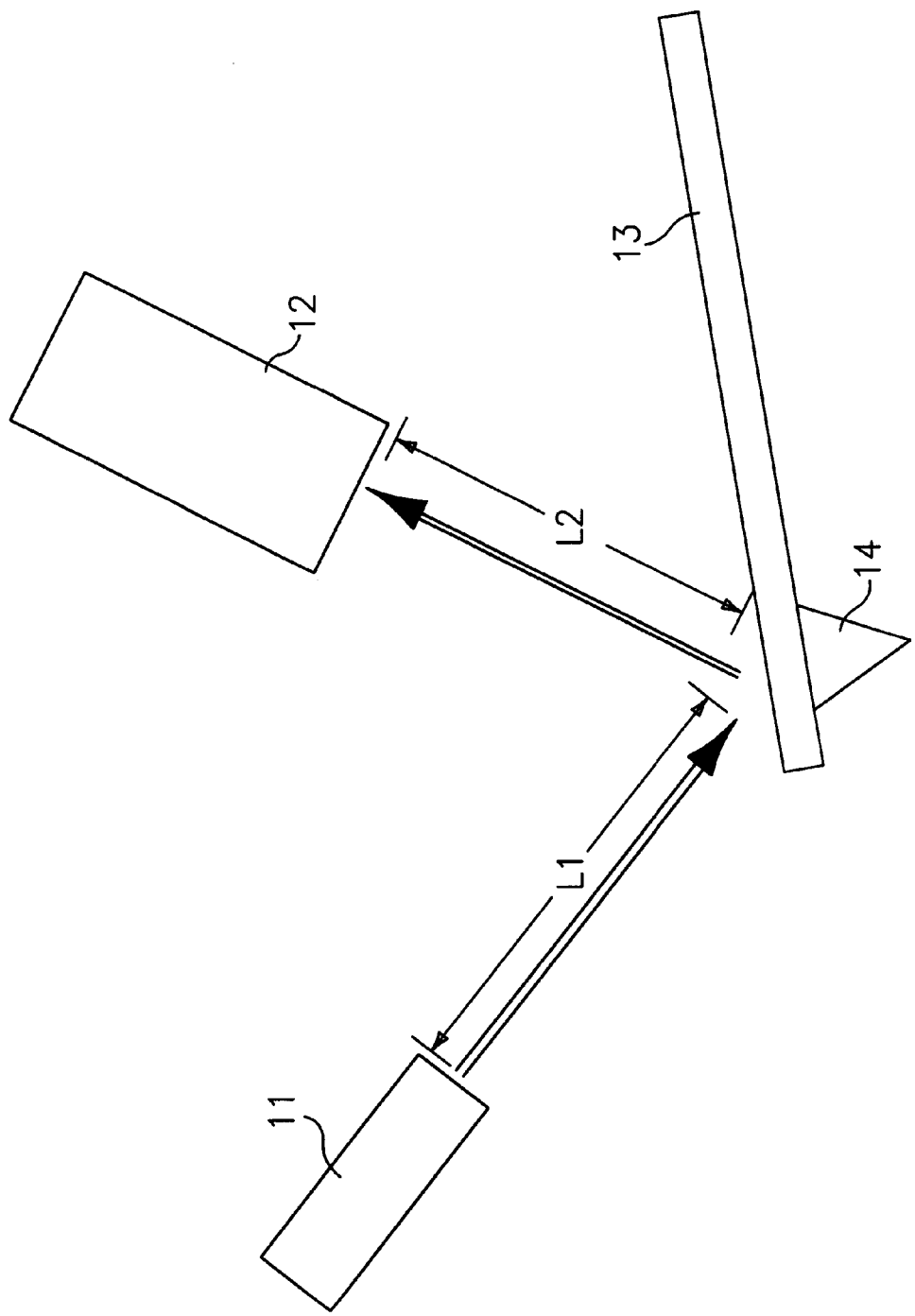
FIG. 1 is a schematic view illustrating a conventional AFM using a light source and a cantilever.
Figure 2A:
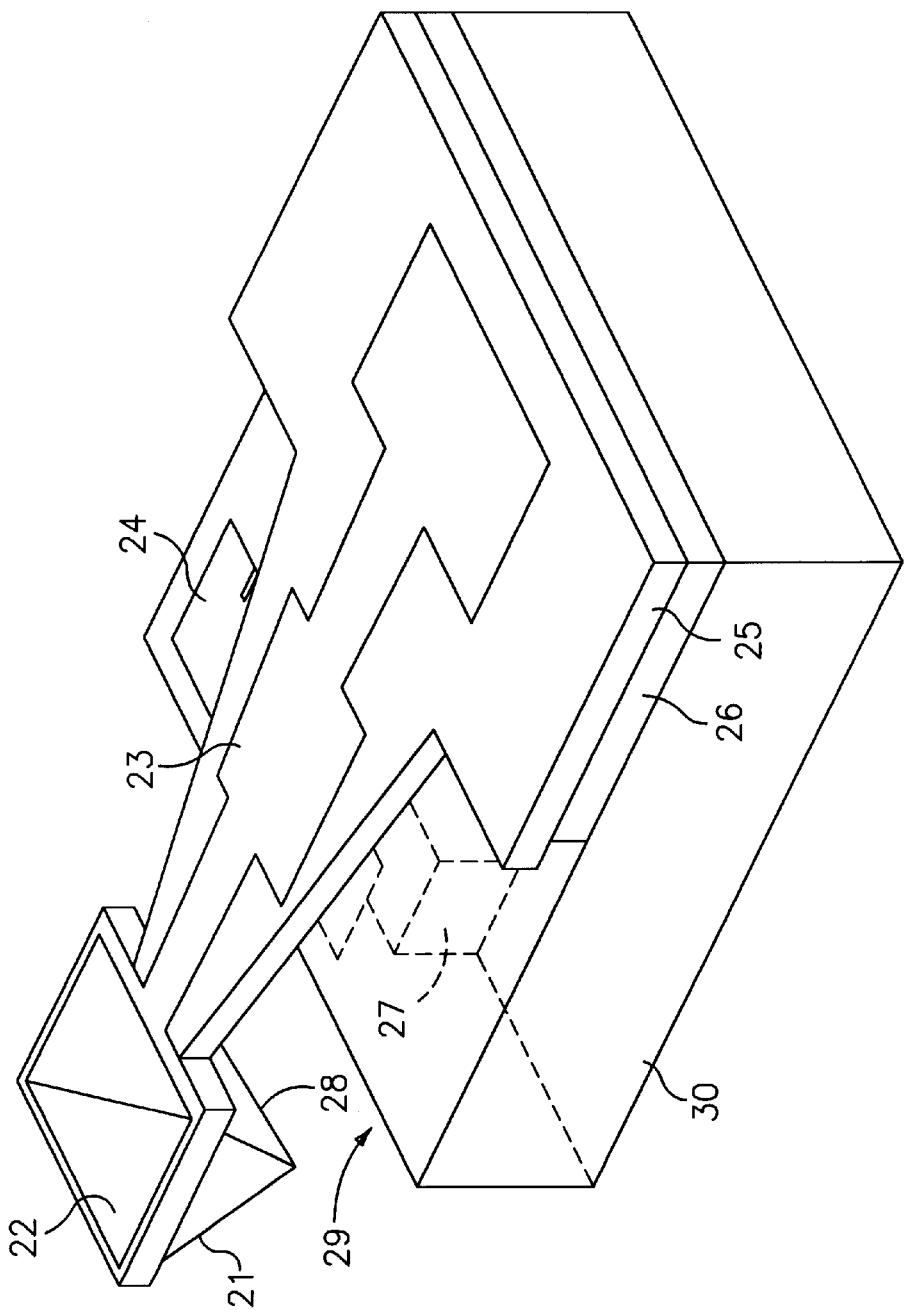
FIG. 2a is a schematic perspective view illustrating an integrated device in which a light emitting element and a cantilever are integrated together in the form of a flip chip in accordance with a first embodiment of the present invention.
Figure 2B:
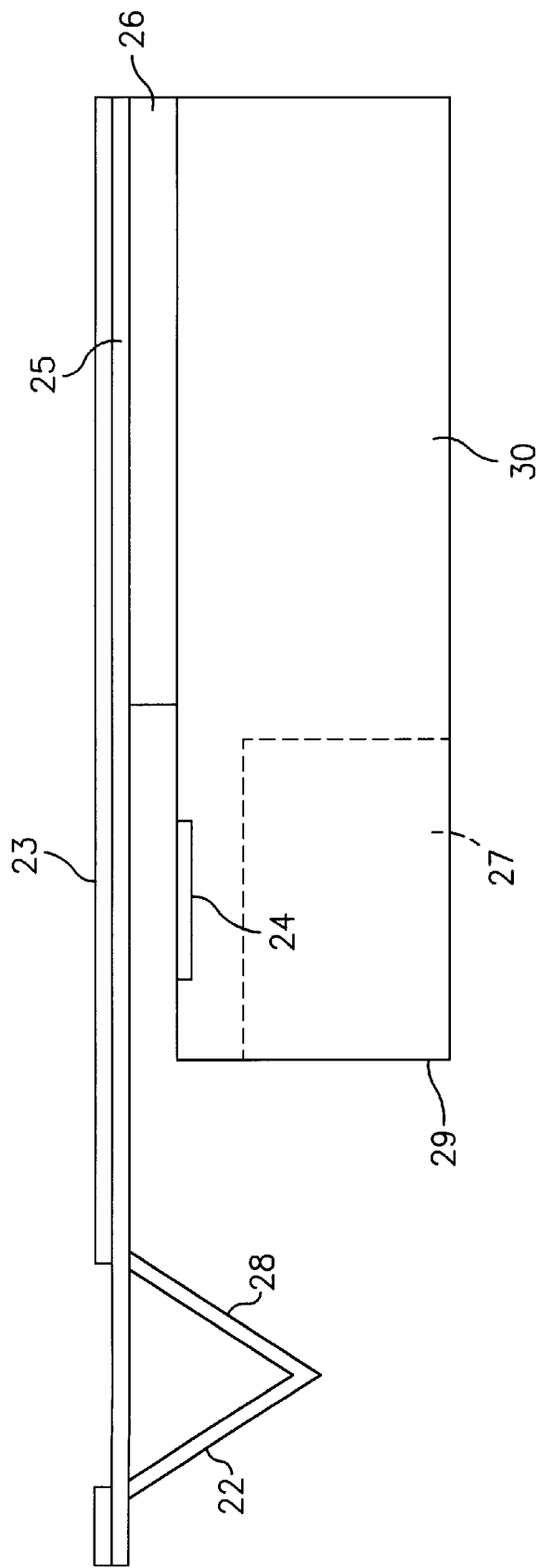

In accordance with this embodiment, a device is provided which has a configuration wherein a light emitting element (LED or LD) as a light source and a cantilever are integrated together in the form of a flip chip. FIG. 2a is a schematic perspective view illustrating the configuration of this embodiment. FIG. 2b is a sectional view of the configuration shown in FIG. 2a. In addition, FIG. 2c is a cross-sectional view taken along the facet C of FIG. 2a and illustrating a light emitting element holder and a light emitting element attached to the holder.

Figure 2C:
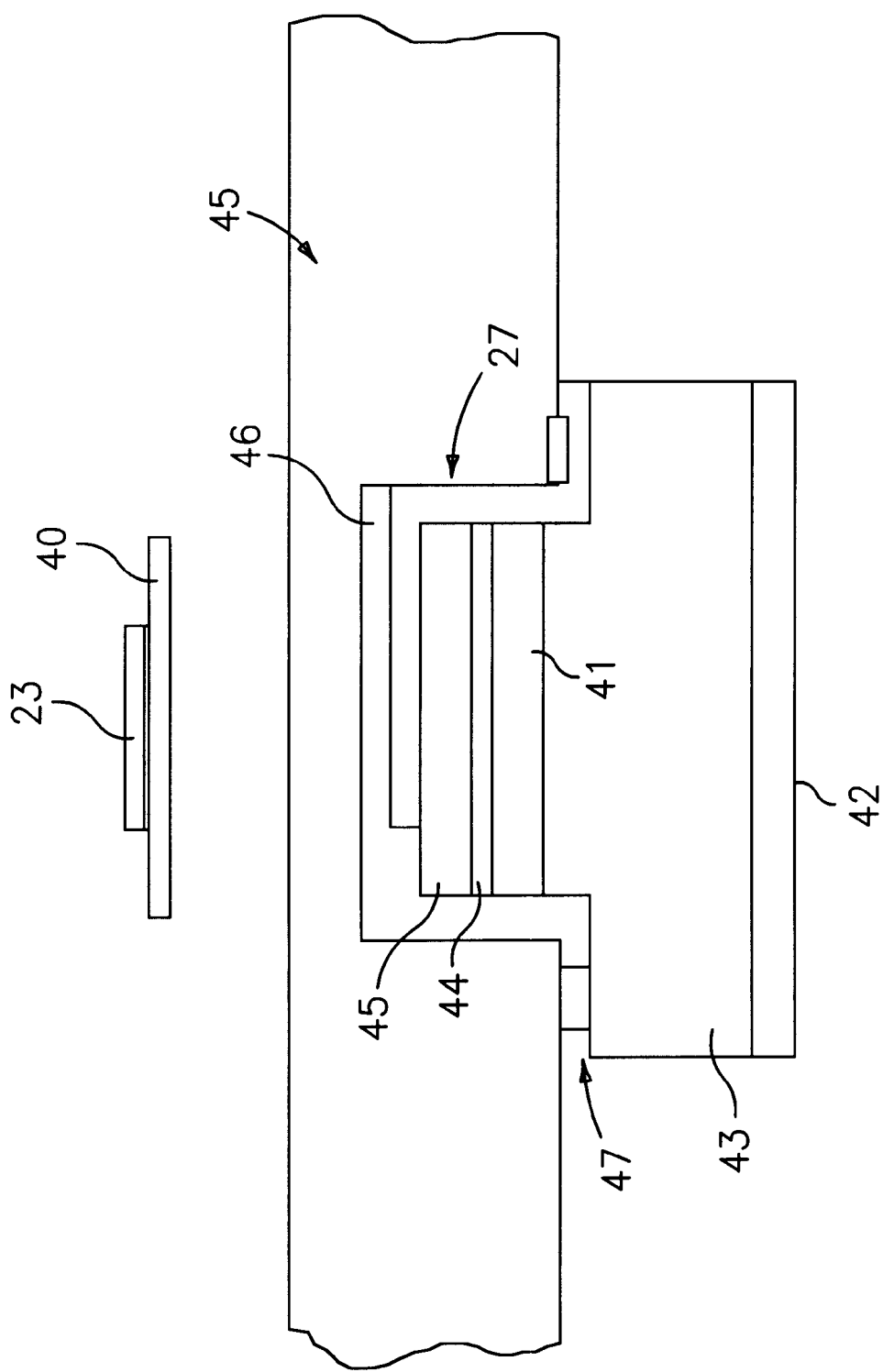

As shown in FIGS. 2a to 2c, this device includes a silicon substrate 30 in which a light emitting element holder 27 and a light emitting element (LED or LD) are disposed at the facet C of the silicon substrate 30. In FIGS. 2a and 2b, the facet C is denoted by the reference numeral 29. An $Si_3N_4$ layer 25 is formed in the form of a cantilever on a portion of the upper surface of the silicon substrate 30 spaced away from the facet C in such a manner that an $SiO_2$ layer 26 is interposed between the silicon substrate 30 and $Si_3N_4$ layer 25. A metal tip 21 is attached to the free end of the cantilever constituted by the $SI_3N_4$ layer 25. The metal tip 21 has an inverted pyramid shape having reflector facets A and B which are denoted by the reference numerals 22 and 28, respectively. The metal tip 21 is formed using a V-groove etch method.

For a closed loop control, the device may include an upper electrode 23 and a lower electrode 24. The upper electrode 23 is formed on the upper surface of the $Si_3N_4$ layer 25 whereas the lower electrode is formed on a portion of the upper surface of the silicon substrate 30 in which the light emitting element holder 27 and light emitting element (LED or LD) are integrated.

The light emitting element holder 27 and light emitting element disposed in the silicon substrate 30 have cross-sectional structures shown in FIG. 2c, respectively.

Referring to FIG. 2c, an n-type GaAs or InP substrate 43 is shown. An n-type ohmic contact/metal layer 42 is formed over the lower surface of the substrate 43. On a desired portion of the upper surface of the substrate 43, an n-type cladding layer 41, a light emitting layer 44 and a p-type cladding layer 45 are sequentially laminated in such a manner that they form an inverted T shape together with the substrate 43. A p-type ohmic contact/metal layer 46 is also formed on a desired portion of the resulting structure. The p-type ohmic contact/metal layer 46 has an upper portion formed on a portion of the upper surface of the p-type cladding layer 45, a lower portion formed on a portion of the upper surface of the n-type GaAs or InP substrate 43, and an intermediate portion formed on side walls of the layers 41, 44 and 45 in one side of the laminated structure. Thus, a light emitting element structure is obtained. This light emitting element structure is attached to the light emitting element holder 27. As shown in FIG. 2c, the light emitting element is electrically connected to the light emitting element holder 27 by the intermediate portion of the p-type ohmic contact/metal layer 46 and a solder bumper 47.

The above-mentioned device, in which the cantilever and light emitting element are integrated together, is fabricated as follows:

First, an $SiO_2$ layer and an $Si_3N_4$ layer are sequentially grown over a silicon substrate having a crystal orientation of (100) (Step 1). The growth of the $SiO_2$ layer and an $Si_3N_4$ layer is carried out in such a manner that the grown layers have a crystal orientation of (111). An etch pit is formed in the $SiO_2$ and $Si_3N_4$ layers and the silicon substrate. A material to be used as a cantilever is deposited in the etch pit. Thereafter, a photoresist film pattern is formed on the resulting structure. Using the photoresist film pattern as a mask, selected portions of the $SiO_2$ and $Si_3N_4$ layers are removed. Subsequently, the photoresist film pattern is completely removed. At the same time, the silicon substrate is selectively removed. Thus, a cantilever having a tip is obtained.

Thereafter, the silicon substrate is etched at its back side, thereby forming a light emitting element holder (Step 2). A light emitting element (LED or LD) having a structure shown in FIG. 2c is then fabricated. The light emitting element is then attached to the light emitting element holder (Step 3).

For a closed loop control, an upper electrode and a lower electrode are formed on the $Si_3N_4$ layer and the portion of the silicon substrate where the light emitting element holder is disposed, respectively.

The metal tip 21 of the cantilever is fabricated by etching the silicon substrate while utilizing an anisotropic etch characteristic of the silicon substrate, thereby forming an inverted pyramid or V-shaped groove, depositing a metal in the groove, and then completely removing the portion of the silicon substrate disposed around the metal layer, thereby leaving only the metal layer. The fabrication of the metal tip 21 is carried out at step 1.

The metal tip may have a structure having only one reflector facet, for example, the reflector facet A, to be used as a mirror. This may be achieved by selectively depositing the metal layer in the inverted pyramid or V-shaped groove formed in the silicon substrate in accordance with an angled evaporation method in such a manner that the metal layer is not deposited on a portion of the groove corresponding to the reflector facet B. Alternatively, a patterning method may also be used. In this case, the metal layer portion on the facet B is removed in accordance with the patterning method.

The device of this embodiment operates in such a manner that a light beam emitted from the light emitting layer 44 included in the light emitting element (LD or LED) is detected after being reflected from the metal tip 21. When the light beam emitted from the light emitting layer 44 is radiated onto the reflector facet B of the metal tip 21, it reflects downwardly from the reflector facet B. On the other hand, the light beam emitted from the light emitting layer 44 is radiated onto the reflector facet A of the metal tip 21, which is formed in accordance with the angled evaporation or patterning method, it reflects upwardly from the reflector facet B. Accordingly, in order to detect a micro shift of the reflecting light beam caused by a micro displacement of the cantilever after amplifying the micro shift, it is required to vary the position of the position photodetector depending on the position of the reflecting light beam.

The cantilever can be appropriately adjusted by applying a bias to the cantilever between the upper and lower electrodes 23 and 24. Accordingly, a closed loop control can be achieved for the device. In other words, the device utilizes the principle of detecting a light beam emitted from a light source, which is formed on one facet of a silicon substrate, after being reflected from a metal tip of a cantilever formed on the other facet of the silicon substrate. This device may also be applied to a data storage purpose by a configuration in which the metal tip 21 is heated by a light beam emitted from the light source (LED or LD), thereby causing it to apply pressure to the surface of a sample.

Second Embodiment

Figure 3A:
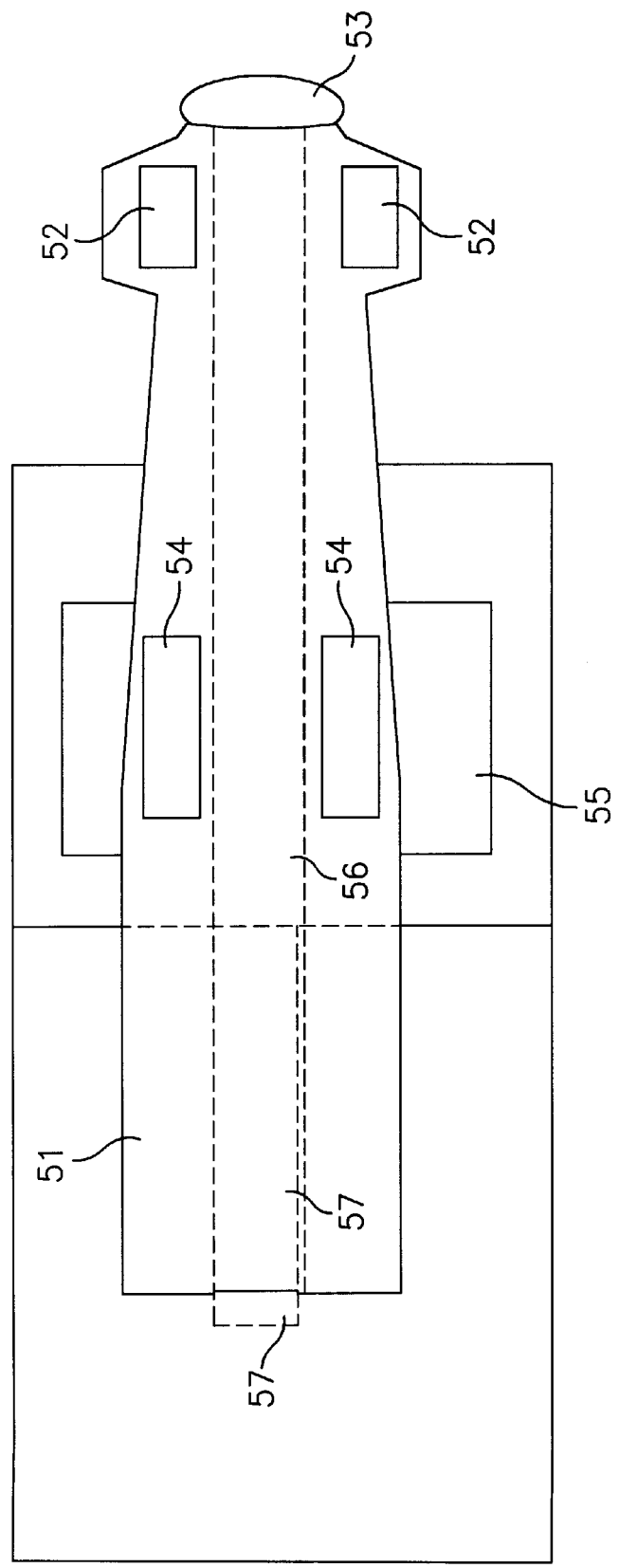
FIG. 3a is a plan view illustrating an integrated device in which a waveguide having the form of a cantilever is integrated with a light emitting element in accordance with a second embodiment of the present invention.

In accordance with this embodiment, a device is provided which has a configuration wherein a waveguide having the form of a cantilever is integrated with a light emitting element. FIG. 3a is a plan view illustrating this device whereas FIG. 3b is a sectional view illustrating the device.

Figure 3B:
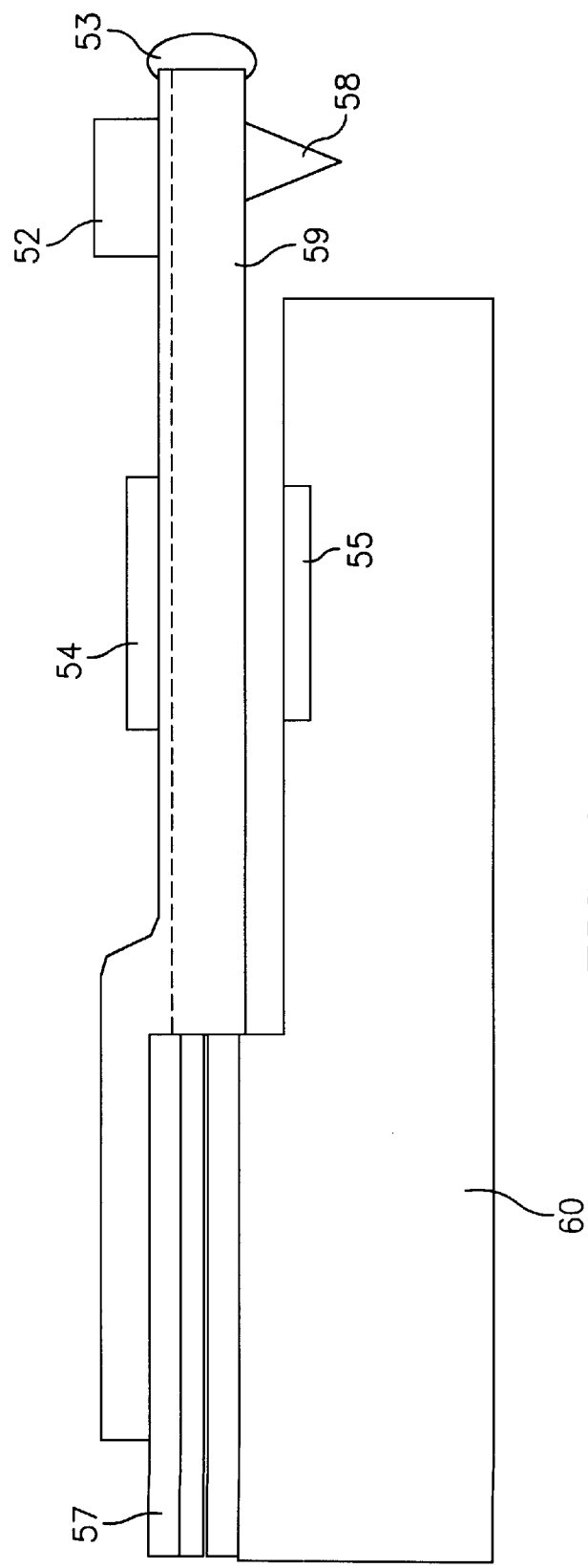

As shown in FIGS. 3a and 3b, this device includes a GaAs/InP substrate 60 having a step at its upper surface. A light emitting element 57 is formed on the higher portion of the upper surface of the substrate 60. An $SiO_2/Si_3N_4$ waveguide 51 is formed on the light emitting element 57. The waveguide 51 extends over and beyond the lower portion of the upper surface of the substrate 60. That is, the waveguide 51 has the form of a cantilever. A focusing lens 53 is provided at the free end of the waveguide 51. Accordingly, the waveguide 51 serves to transmit a light beam emitted from the light emitting element 57 to the lens 53. At the free end portion not contacting the light emitting element 57, the waveguide is provided with a metal tip 58 formed on the lower surface thereof adjacent to the lens 53 and with metal weights 52 formed on the upper surface thereof adjacent to the lens 53. The metal weights 52 serve to increase the sensing function of the device. The waveguide 51 also has a guiding ridge 56 extending longitudinally along the central portion of the waveguide 51.

For a closed loop control, the device may also include a lower electrode 55 formed on the lower surface of the GaAs/InP substrate 60 and an upper electrode 54 formed on a portion of the upper surface of the waveguide 51 positioned above the lower electrode 55.

The above-mentioned device, in which the cantilever and light emitting element are integrated together, is fabricated as follows:

First, a light emitting element (LED or LD) is formed on a GaAs/InP substrate (Step 1).

An $SiO_2/Si_3N_4$ waveguide is then formed on the light emitting element in such a manner that it extends to have a free end spaced away from the light emitting element (Step 2). Thereafter, a metal tip is formed on the lower surface of the waveguide adjacent to the free end in the same manner as in the first embodiment (Step 3). A focusing lens is also formed on the free end of the waveguide (Step 4).

For a closed loop control, electrodes are formed on the $SiO_2/Si_3N_4$ waveguide and GaAs/InP substrate, respectively (Step 5). Finally, metal weights are formed on opposite side portions of the $SiO_2/Si_3N_4$ waveguide adjacent to the free end of the waveguide, respectively (Step 6).

In the integrated device according to this embodiment, a light beam emitted from the light emitting element 57 on the GaAs/InP is transmitted through the $SiO_2/Si_3N_4$ waveguide 51. In this case, the $SiO_2/Si_3N_4$ waveguide 51 also serves as a cantilever.

When a sample approaches the metal tip 58, the waveguide 51 is bent, thereby causing the light beam emerging from the free end of the waveguide 51 to be finely shifted. This shift of the light beam is sensed in an amplified state by a position detector which is positioned at a place spaced away from the waveguide 51. Thus, a micro shift of the cantilever (namely, the $SiO_2/Si_3N_4$ waveguide in this case).

Where the light emerging from the $SiO_2/Si_3N_4$ waveguide 51 is greatly dispersed, it is impossible to accurately determine the displaced position of the cantilever because the intensity of the light detected by the position photodetector decreases greatly. To this end, the lens 53 is installed on the output end of the $SiO_2/Si_3N_4$ waveguide 51 in order to concentrate the light, thereby preventing a dispersion of the light. The electrodes, which are formed on the cantilever 59 and GaAs/InP substrate 60 respectively, are used to achieve a fine adjustment of the cantilever 59 as well as a closed loop control for the device.

Third Embodiment

In accordance with this embodiment, a device is provided which has an integrated configuration wherein a light emitting element (LED or LD) is formed on an inclined facet of a silicon substrate while a cantilever is formed on a surface of the silicon substrate opposite to the inclined facet. This device has a cross-sectional structure shown in FIG. 4.

Figure 4:
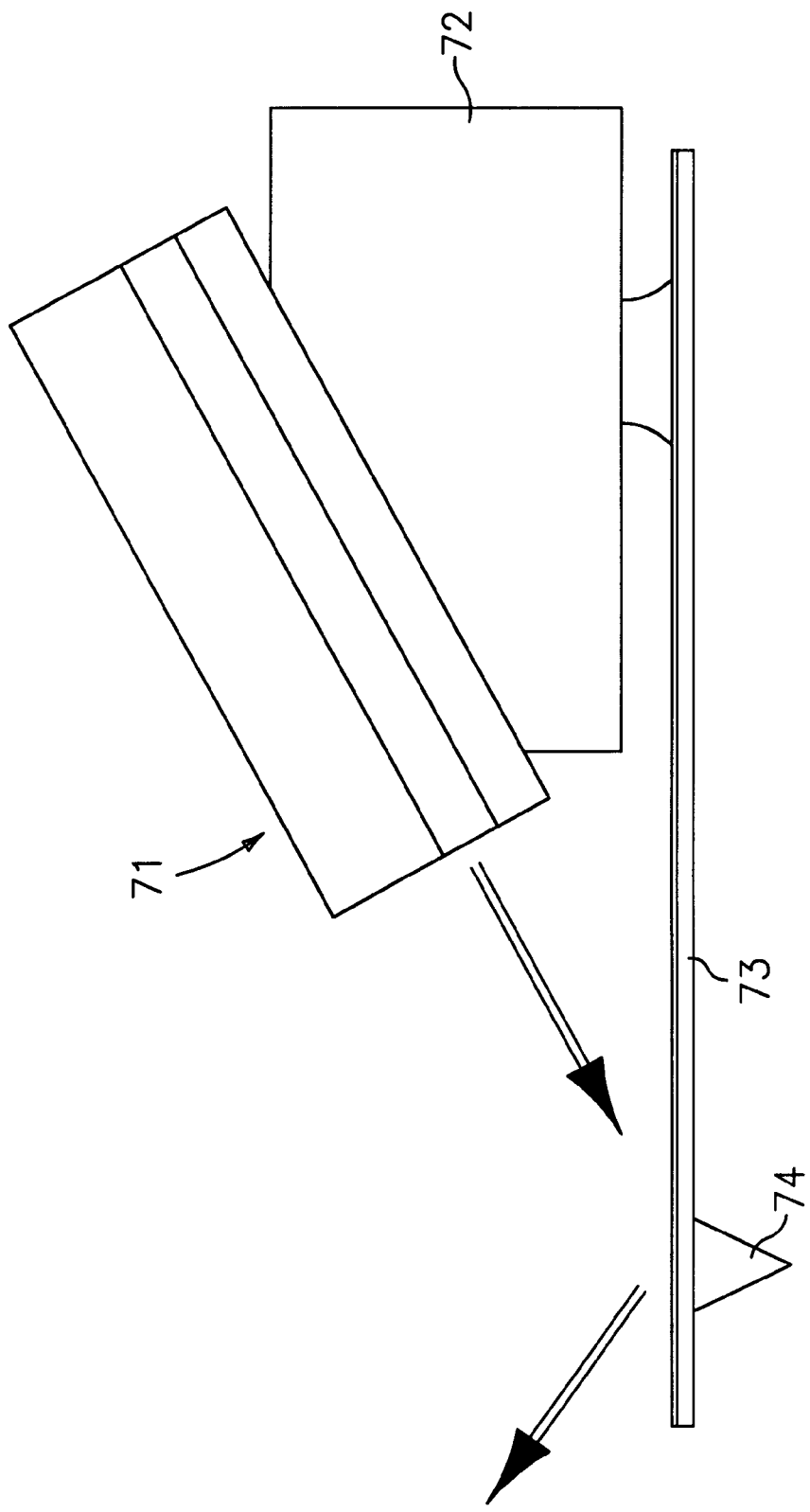
FIG. 4 is a sectional view illustrating an integrated device in which a light emitting element is formed on an inclined facet of a silicon substrate while a cantilever is formed on a surface of the silicon substrate opposite to the inclined facet in accordance with a third embodiment of the present invention.

As shown in FIG. 4, a light emitting element 71 is formed on an inclined facet of a silicon substrate 72. A cantilever 73 is formed on the lower surface of the silicon substrate 72 opposite to the inclined facet. A metal tip 74 is also formed on the lower surface of the cantilever 73 adjacent to the free end of the cantilever 73.

The above-mentioned device, in which the cantilever and light emitting element are integrated together, is fabricated as follows:

A silicon substrate having a crystal orientation of (100) is prepared and then formed with an inclined facet (Step 1). The formation of the inclined facet is carried out by forming a deep etch pit having an orientation of (111) in the silicon substrate.

A light emitting element, which is separably fabricated, is attached to the inclined facet of the silicon substrate (Step 2). A cantilever is then formed on the surface of the silicon substrate opposite to the inclined facet (Step 3). Thereafter, a metal tip is formed on the lower surface of the cantilever at the free end of the cantilever (Step 4).

In the integrated device according to this embodiment, a light beam emitted from the light emitting element 71 is reflected from the body of the cantilever 73. The reflected light beam is detected by a position photodetector spaced away from the cantilever 73.

Fourth Embodiment

Figure 5:
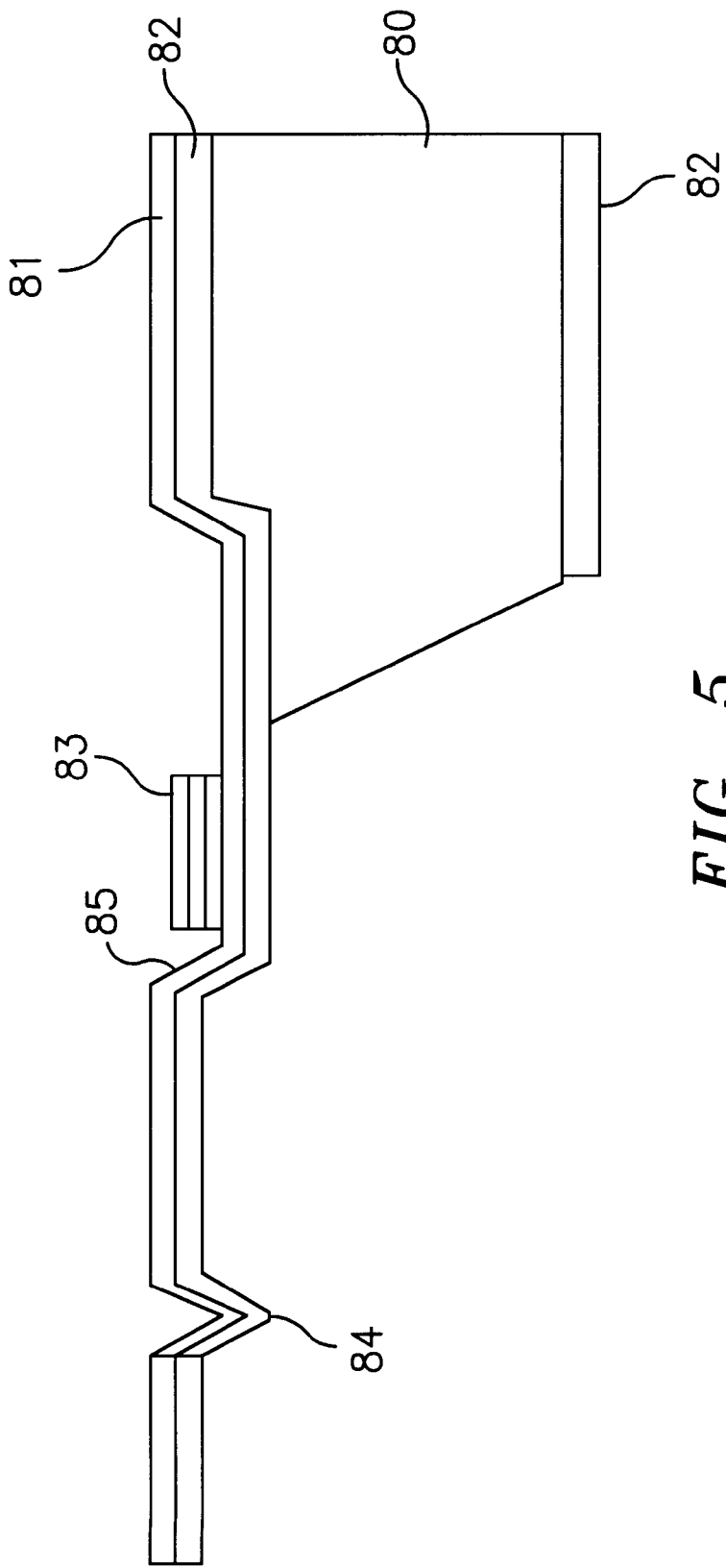
FIG. 5 is a sectional view illustrating in which a light emitting element is integrated on a cantilever which is also formed with a reflector facet in accordance with a fourth embodiment of the present invention.

In accordance with this embodiment, a device is provided which has a configuration wherein a light emitting element (LED or LD) is integrated on a cantilever which is also formed with a reflector facet. FIG. 5 illustrates a cross-sectional structure of this device.

Referring to FIG. 5, a silicon substrate 80 is shown which has an $Si_3N_4$ layer 82 at its lower surface. The silicon substrate 80 also has, at the upper surface thereof, a cantilever and a light emitting element holder adapted to attach a light emitting element thereon. The cantilever and light emitting element holder are constituted by an $Si_3N_4$ layer 82 and a metal layer 81 sequentially formed on the upper surface of the silicon substrate 80, respectively. A tip 84 is formed at the free end of the cantilever.

A light emitting element 83 is attached to the light emitting element holder which is laminated on the cantilever. The light emitting element holder has an inclined facet near the light emitting element 83. The inclined facet serves as a reflector facet 85.

The above-mentioned device, in which the light emitting element is integrated on the cantilever, is fabricated as follows:

First, a cantilever having a tip and a light emitting holder are formed over a silicon substrate in accordance with an anisotropic silicon etch method (Step 1).

An active layer separably prepared for a light emitting element is attached to a desired portion of the light emitting element holder (Step 2). The active layer is obtained using a lift off technique. Thereafter, the silicon substrate is etched at its back side (Step 3).

The lift off technique used at step 2 is a technique which is used in the case of fabricating a semiconductor laser having a structure including a thick substrate and a thin active layer. In accordance with this technique, the thin active layer, which is to be used for the light emitting element, is separated from the substrate by utilizing an etch rate difference between the active layer and an epitaxial layer formed over the substrate. That is, a sacrificial epitaxial layer is first grown over the substrate. An active epitaxial layer is grown over the sacrificial epitaxial layer. The separation of the active layer is achieved by utilizing the difference between a high etch rate of the sacrificial epitaxial layer and a low etch rate of the active epitaxial layer.

In the integrated device according to this embodiment, both the tip 84 and the light emitting element holder are integrated together on the silicon substrate 80. One surface of the light emitting element holder is used as the reflector facet 85 in order to detect a shift of the light beam resulting from a micro displacement of the cantilever. In this case, it is important to appropriately determine relative depths of the tip 84 and light emitting element holder. If possible, the light emitting element holder should have a depth greater than the depth of the tip 84. This is because the distance between the tip 84 and light emitting element holder can be minimized only when the light emitting element holder is deeper than the tip 84. Where the distance between the tip 84 and light emitting element holder is minimized, an improvement in the sensitivity of the cantilever is achieved. To this end, after the light emitting element is fabricated, the GaAs substrate of the light emitting element is removed using the lift off technique so that the active layer is separated from the light emitting element. Only the separated active layer is attached to the light emitting element holder.

Fifth Embodiment

In accordance with this embodiment, a device is provided which has a configuration wherein a surface emitting laser (SEL) as a light source is integrated on a cantilever. This device has a cross-sectional structure shown in FIG. 6.

Figure 6:
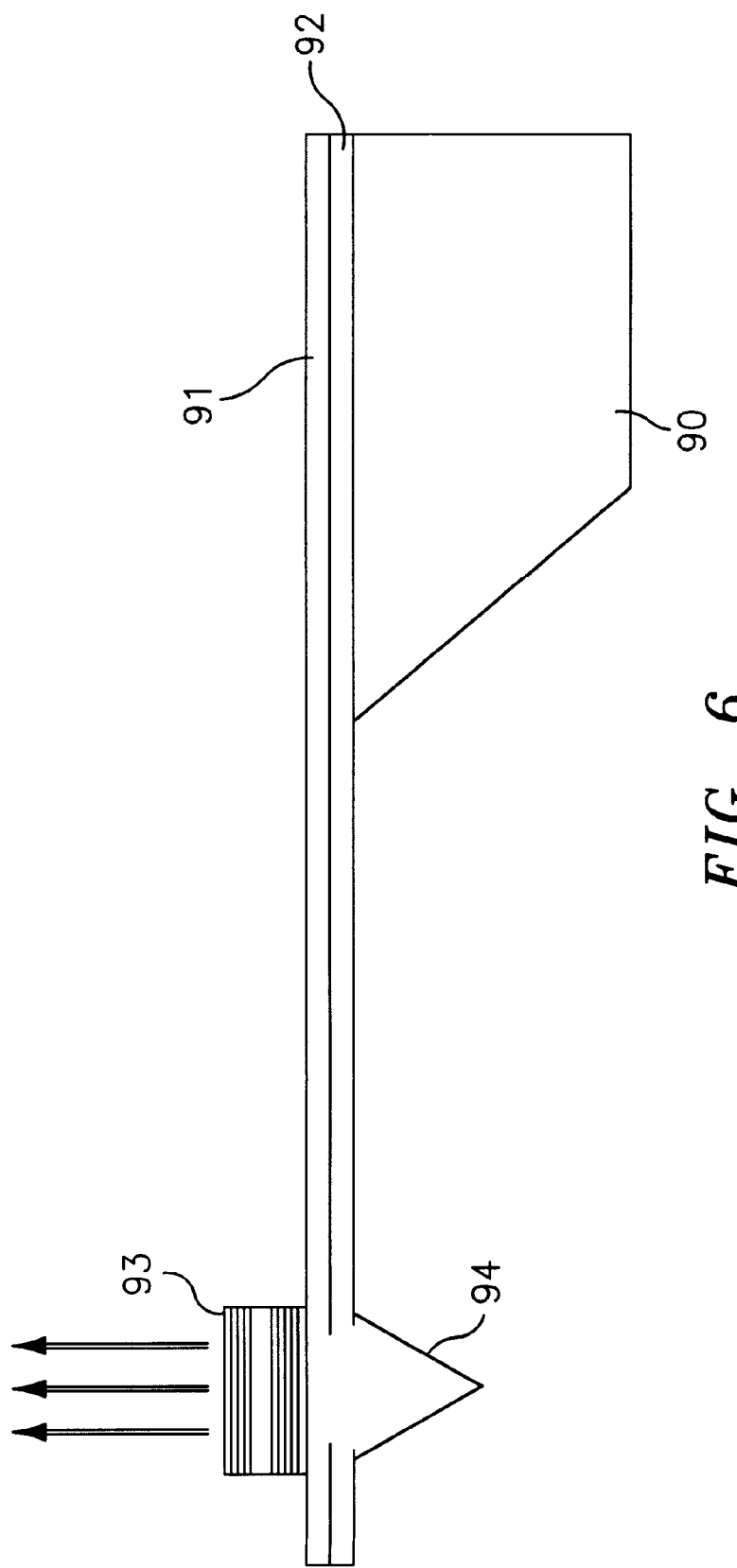
FIG. 6 is a sectional view illustrating a device in which a surface emitting laser (SEL) as a light source is integrated on a cantilever in accordance with a fifth embodiment of the present invention.

Referring to FIG. 6, a silicon substrate 90 is shown which is laminated with an $Si_3N_4$ layer 92 and a metal layer 91. The $Si_3N_4$ layer 92 and metal layer 91 constitute a cantilever. The cantilever is provided with a tip 94 formed on the lower surface of the free end of the cantilever. An SEL 93 is integrated on the cantilever having the tip 94.

The above-mentioned device, in which the SEL is integrated on the cantilever, is fabricated as follows:

First, an inverted pyramid or V-shaped groove is formed in a silicon wafer 100 in accordance with the anisotropic silicon etch method (Step 1).

A material to be used for a cantilever is then deposited in the inverted pyramid or V-shaped groove, thereby forming the cantilever (Step 2).

An SEL is separately fabricated and then attached to the cantilever (Step 3). Thereafter, the silicon substrate is etched at its back side (Step 4).

In the integrated device according to this embodiment, the SEL 93 integrated on the free end of the cantilever upwardly emits a light beam. Accordingly, the position photodetector can directly detect a micro displacement of the cantilever. The SEL 93 can emit a circular beam having a very small width.

The integrated devices of the above-mentioned embodiments can be applied to micro physical quantity (accelerated velocity, mass, strain, and temperature, etc.) sensors.

For example, where the integrated device of the present invention is used as an accelerated velocity sensor, it can sense even an accelerated velocity of a very small quantity. That is, when an accelerated velocity of a very small quantity is generated, a micro displacement occurs in the cantilever of the sensor. The micro displacement is amplified so that it can be sensed by the sensor. Where the integrated device of the present invention is used as a temperature sensor, it can sense even a slight variation in temperature. In this case, the cantilever of the integrated device is constituted by materials having different thermal expansion coefficients. When a slight variation in temperature occurs in a given space, a micro displacement occurs in the cantilever of the sensor. The micro displacement is amplified so that it can be sensed by the sensor.

The integrated device of the present invention can also be used to measure displacement of a scanning probe microscope (SPM).

Where the integrated device of the present invention is used to measure displacement of a scanning probe microscope (SPM) such as an AFM or an STM, it is possible to measure the surface structure of a sample in an atomic magnification. In this case, an optional portion of a sample is scanned, using a tunneling phenomenon of electrons in quantum dynamics, under the condition in which the tip of the integrated device is spaced apart from the sample by a distance of several angstroms, tunneling current is maintained between the tip and sample by a feedback circuit. A signal generated from the feedback circuit to maintain the current is recorded in a computer. The recorded data is used to draw the surface structure of the sample. Thus, the surface structure of the sample can be measured in an atomic magnification.

Where a light beam emitted from an optical device such as an LD is transmitted through a fine optical fiber, it is necessary to align the optical fiber with the beam output end. In this case, the integrated device of the present invention can be effectively used.

As apparent from the above description, the present invention provides an integrated device having a configuration in which a light source such as LED, LD or SEL and a cantilever are integrated together on a single substrate in such a manner that they are arranged in proximity. Accordingly, the device of the present invention requires no additional alignment for its constituting elements. In accordance with this configuration, it is possible to greatly reduce the space occupied by the constituting elements. It is also possible to reduce the limitation on the focusing of light.

Since the integrated device of the present invention can accurately measure a micro displacement of the cantilever, it can be applied to micro physical quantity sensors. The device can also be used to measure displacement of a SPM tip. In addition, the device of the present invention may be used to achieve an alignment required in optical devices and LD's.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated device, comprising:
   a silicon substrate;
   a light element holder for a light emitting element integrated in a facet of the silicon substrate;
   a cantilever made of an $Si_3N_4$ layer formed on a portion of an upper surface of the silicon substrate spaced away from the facet in such a manner that an $SiO_2$ layer is interposed between the silicon substrate and the $Si_3N_4$ layer; and
   a metal tip attached at a free end of the cantilever and having at least one reflector facet.

2. The integrated device in accordance with claim 1, further comprising:
   an upper electrode formed on the $Si_3N_4$ layer; and
   a lower electrode formed on a portion of the upper surface of the silicon substrate where the light emitting element holder and the light emitting element are formed and where the $SiO_2$ layer does not exist, the lower electrode being comprised of a $p^-$ or $n^+$ diffusion layer;
   whereby a closed loop control for the integrated device is carried out.

3. The integrated device in accordance with claim 2 used for a micro physical quantity sensor.

4. The integrated device in accordance with claim 2 used to measure a displacement of the tip of a scanning probe microscope.

5. The integrated device in accordance with claim 2 used for an alignment of an optical device and a laser diode.

6. The integrated device in accordance with claim 1 used for a micro physical quantity sensor.

7. The integrated device in accordance with claim 1 used to measure a displacement of the tip of a scanning probe microscope.

8. The integrated device in accordance with claim 1 used for an alignment of an optical device and a laser diode.

9. An integrated device, comprising:
   a GaAs/InP substrate having a step at an upper surface thereof;
   a light source having a light emitting element formed on a higher portion of the upper surface of the GaAs/InP substrate;
   a cantilever waveguide made of $SiO_2/Si_3N_4$ formed on the light emitting element and provided at a free end thereof with a focusing lens, the waveguide serving to transmit a light beam from the light emitting element to the lens; and
   a metal tip attached on a lower surface of the free end of the cantilever.

10. The integrated device in accordance with claim 9, further comprising:
    a metal weight provided at an upper surface of the $SiO_2/Si_3N_4$ waveguide;
    a lower electrode formed on a lower surface of the GaAs/InP substrate; and
    upper electrodes formed on the upper surface of the $SiO_2/Si_3N_4$ waveguide above the lower electrode in opposite sides of the waveguide, respectively;
    whereby a closed loop control for the integrated device is carried out.

11. The integrated device in accordance with claim 9 used for a micro physical quantity sensor.

12. The integrated device in accordance with claim 9 used to measure a displacement of the tip of a scanning probe microscope.

13. An integrated device, comprising:
    a silicon substrate having an inclined facet;
    a light source having a light emitting element integrated on the inclined facet of the silicon substrate;
    a cantilever integrated on a lower surface of the silicon substrate; and
    a metal tip attached on a lower surface of a free end of the cantilever.

14. An integrated device, comprising:
    a silicon substrate;
    a cantilever made of a metal layer formed on an upper surface of the silicon substrate in such a manner that an $Si_3N_4$ layer is interposed between the silicon substrate and the metal layer,
    the $Si_3N_4$ layer being adapted as a light emitting element holder;
    a metal tip attached on a free end of the cantilever;
    a light source having a light emitting element attached to the light emitting element holder disposed on the cantilever; and
    the light emitting element holder has an inclined surface serving as a reflector facet.

15. An integrated device, comprising:
    a silicon substrate;
    a cantilever made of an $Si_3O_4$ layer formed on the silicon substrate, and a metal layer formed over the $Si_3O_4$ layer;
    a metal tip attached on a lower surface of a free end of the cantilever; and
    a surface emitting laser integrated on an upper surface of the cantilever.

* * * * *

UNITED STATES PATENT AND TRADEMARK OFFICE
CERTIFICATE OF CORRECTION

| | | |
|---|---|---|
| PATENT NO. | : 5,982,009 | Page 1 of 1 |
| APPLICATION NO. | : 09/001386 | |
| DATED | : November 9, 1999 | |
| INVENTOR(S) | : Songcheol Hong and Sookun Jeon | |

It is certified that error appears in the above-identified patent and that said Letters Patent is hereby corrected as shown below:

On the Title Page
Item (30), delete "Mar. 1, 1997" and replace with --Jan. 3, 1997--; and delete "00024" and replace with --97-00024--.

Signed and Sealed this

Thirty-first Day of January, 2012

David J. Kappos
*Director of the United States Patent and Trademark Office*